June 2, 1931.   H. E. WETHERBEE   1,808,740
DUPLEX REAR VIEW MIRROR
Filed Oct. 9, 1928

Inventor:
Herbert E. Wetherbee
by
Attorney

Patented June 2, 1931

1,808,740

UNITED STATES PATENT OFFICE

HERBERT E. WETHERBEE, OF CLEVELAND HEIGHTS, OHIO, ASSIGNOR OF ONE-THIRD TO RICHARD F. GRANT, OF NEW YORK, N. Y., AND ONE-THIRD TO HOWARD M. HANNA, OF CLEVELAND, OHIO

DUPLEX REAR-VIEW MIRROR

Application filed October 9, 1928. Serial No. 311,380.

My invention relates to improvements in duplex rear-view mirrors, and has for its object the provision of an appliance giving back to the user a brilliant image or reflection under daylight driving conditions, while affording a non-glaring reflection from the lights of following automobiles under night driving conditions.

A secondary object of my invention is to provide an appliance of this nature which is readily adjustable to conform with the varying needs of driving, as well as one that is adapted for use upon different makes of cars, and finally, a device that is effective, simple and cheap to construct.

Rear-view mirrors have come to be standard equipment upon modern automobiles, and have been adopted to the extent that their use may be designated as almost universal for daylight driving. At night, however, the ordinary rear vision mirror is practically useless, due to the blinding glare from following headlights, hence the majority of drivers resort to the practice of tilting the mirror to render it inoperative or reflect the light away from the driver's eyes.

Nevertheless, the requirement of a rear-view mirror at night possibly is more imperative than for one in use during daylight hours, and a number of attempts have been made to produce a device of this character that is capable of satisfactory service at night. Such devices primarily turn upon the use of a smoked or dark colored glass, but this is not well adapted for daylight driving, while entailing certain disadvantages that render these appliances undesirable, if not impractical.

Composite appliances also have been devised for the same general purpose, such as shown in the patents to Hoag, No. 1,178,072, and to Bell, No. 1,699,043, wherein a deeply colored glass screen is associated with a mirror; the device being adapted to be completely rotated for adjustment and use. However, the colored glass screen necessarily reflects two images, one of which is colored and displaced with respect to the other, and liable to result in confusion thereof, with possible accident.

Accordingly, I have provided in a single and extremely simple device, a duplex rear vision mirror or reflector, which is adapted, merely by slightly altering its angular position, to serve alternatively, and with equal satisfaction during day or night driving. Thus, I have provided, in association with a white or clear glass mirror, enclosed within a surrounding shadow-box casing, a transparent white or clear glass member positioned before, and at an acute angle with said mirror, through which the images or reflections of the latter normally proceed. The surface of the forward member, in turn, may be used for a dull reflection, as at night, alternative to the brilliant or high intensity reflection of said mirror. Of course, a suitable reflector, other than a glass mirror, may be employed. The use of my appliance, moreover, is not necessarily restricted to road vehicles. This device preferably is mounted adjustably upon a short-coupled bracket of unitary construction, and it is made as light in weight, as practicable, to minimize vibration, when in use upon an automobile.

The structural features of my improvement, and the principal utility thereof may be better explained by referring to the accompanying drawings, wherein.

There are two essential elements, comprising a reflector and a coacting clear or uncolored glass sub-reflector, in the instant appliance, which is designed to combine in a single structure a suitable rear vision mirror and a non-glaring reflector disposed at an acute angle therewith. Thus by altering the angular position of the appliance with respect to the eyes of the driver, substantially through the arc of said acute angle, one or the other of these reflecting surfaces is rendered effective.

Figure 5:
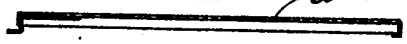
Fig. 5 is a longitudinal section of the removable cover.
Figure 6:
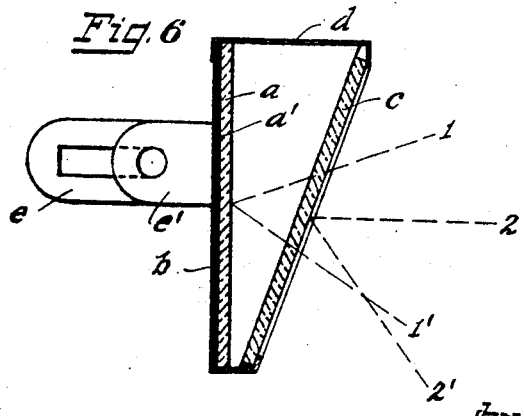
Fig. 6 is a vertical section of the device on line 6—6, Fig. 7.
Figure 7:
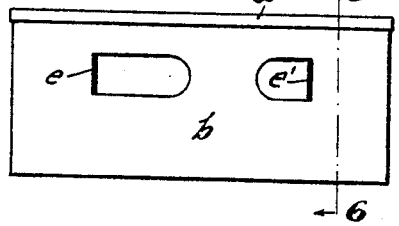
Fig. 7 is a rear view of the device with the supporting bracket removed.

Preferably a thin clear glass mirror $a$, silvered at $a'$, is mounted rearwardly of the metallic frame $b$, suitably stamped at $b'$ to hold said mirror in place. This frame is open at the top and in front, and is stamped at $b''$ to accommodate the thin clear glass member $c$, while the cover $d$ (of Fig. 5) closes the top. This cover affords an overhanging member, and forms, with the sides of the frame, a shadow-box for preventing access of light to the mirror from the top and sides; thereby intensifying the reflected images from said mirror. The back of the metal frame is cut out to form the slotted lug $e$ and perforated lug $e'$ through which a bolt $f$, having a securing thumb-nut $f'$, extends to hold the device in various positions of adjustment with respect to its bracket $g$, and mounting $h$ upon the supporting frame of the car.

Figure 1:
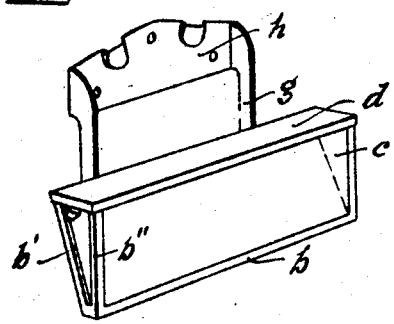
Figure 1 is a perspective view of the assembled device.
Figure 2:
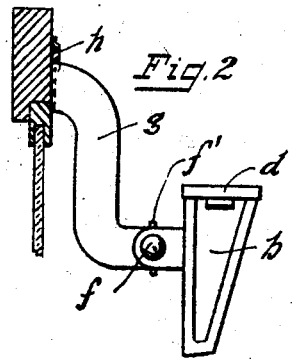
Fig. 2 is a side or end view thereof.
Figure 3:
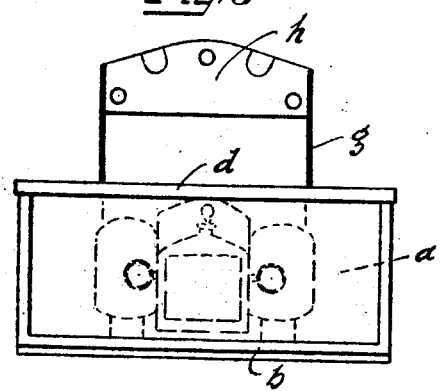
Figs. 3 and 4 are front views, respectively indicating the normal and the glaring images produced by the mirror member.
Figure 4:
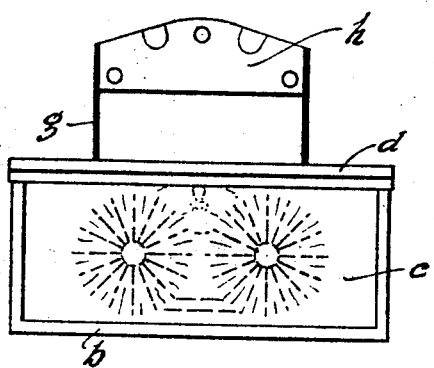

It will be observed that the reflector $a$ and its coacting sub-reflector $c$ are positioned in the frame approximately at an angle of 15°. Thus, the light from the reflected object normally may be represented diagrammatically by the angle 1—$a$—1′, disregarding diffraction and the somewhat exaggerated thickness of the mirror. This is the daylight reflection or transmission of light, the image of which traverses member $c$ and is indicated in Fig. 3. However, at night, the following headlights (or other lights of a trailing car) produce the customary glare generally indicated by Fig. 4, if the mirror $a$ remains in service.

Instead, at night, the device is tilted approximately through 15° and the glass, or sub-reflector member may be used by the motorist to obtain the desired view from the rear; the reflection being diagrammatically indicated by the angle 2—$c$—2′. The surface of the glass, of course, is of relatively low efficiency or intensity as a reflector, and the glare consequently is avoided.

In order to provide adequate adjustment for my improved appliance in planes at right angles to each other, not only is it pivoted to move in a horizontal plane by reason of the movement afforded bolt $f$ in the slotted lug $e$, but the entire device may be tilted upon the bolt $f$ with respect to the supporting bracket $g$, normally extending down rearwardly of the windshield. The particular features of this mounting, however, form no necessary part of my invention, and any suitable mounting for the appliance is contemplated herein.

It will be seen that my improved duplex mirror is equally adapted for daylight or night driving and simply by tilting the appliance, as above indicated, either the reflector member, affording a brilliant image through the glass, or the sub-reflector of low efficiency or intensity, alternatively may be used to suit the varying requirements of driving.

In the instant structure, it will be seen that the mirror is protected from dust and dirt, as well as from accidental injury, by a closed casing. The mirror and glass member advantageously may be made from thin glass, such as is commercially sold for lantern slides, but other reflector members are contemplated by the appended claims, except as otherwise specified therein.

Having now described in detail the structure and utility of my improvement, I claim as new, together with such modifications as may be made by those skilled in the art, the following:

1. In a device of the class described, the combination with a high intensity reflector member, of a clear glass member positioned at an acute angle therewith, and an adjustable mounting for said associated members, whereby an acute angle adjustment of the device permits a high intensity reflection from the one member in the day time and a low intensity reflection from the clear glass member in the night time.

2. In a device of the class described, the combination with a silvered glass mirror, of a clear glass member positioned in front of the mirror at an acute angle therewith, and an adjustable mounting for the device whereby an acute angle adjustment thereof permits a high intensity reflection from the mirror in the day time, and a low intensity reflection from the clear glass member in the night time.

3. In a device of the class described, the combination with a silvered glass mirror, of a clear glass member positioned at an acute angle therewith, a shadow-box frame therefor, and a mounting for said associated members, whereby an acute angle adjustment of the device permits a high intensity reflection from the mirror in the day time and a low intensity reflection from the clear glass member in the night time.

In testimony whereof I do now affix my signature.

HERBERT E. WETHERBEE.